United States Patent [19]
Kim

[11] Patent Number: 5,845,131
[45] Date of Patent: Dec. 1, 1998

[54] MULTIPROCESSOR SYSTEM EMPLOYING AN IMPROVED SELF-CODED DISTRIBUTED INTERRUPT ARBITRATION TECHNIQUE

[75] Inventor: Ho-Seop Kim, Incheon, Rep. of Korea

[73] Assignee: Daewoo Telecom Ltd., Incheon, Rep. of Korea

[21] Appl. No.: 657,848

[22] Filed: May 31, 1996

[30] Foreign Application Priority Data

May 31, 1995 [KR] Rep. of Korea .................. 1995-14434

[51] Int. Cl.⁶ ..................................................... G06F 13/36
[52] U.S. Cl. ...................... 395/733; 395/739; 395/725; 395/325; 364/513
[58] Field of Search ................... 395/733, 725, 395/325, 739; 364/513

[56] References Cited

U.S. PATENT DOCUMENTS

| | | | |
|---|---|---|---|
| 5,067,071 | 11/1991 | Schanin et al. | 395/275 |
| 5,168,568 | 12/1992 | Thayer et al. | 395/725 |
| 5,179,707 | 1/1993 | Piepho | 395/725 |
| 5,265,215 | 11/1993 | Fukuda et al. | 395/325 |
| 5,410,710 | 4/1995 | Sarangdhar et al. | 395/725 |
| 5,495,615 | 2/1996 | Nizar et al. | 395/733 |

*Primary Examiner*—Ayaz R. Sheikh
*Assistant Examiner*—Eric S. Thlang
*Attorney, Agent, or Firm*—Pennie & Edmonds LLP

[57] ABSTRACT

A multiprocessor system has a shared bus and a plurality of processor modules, wherein the shared bus includes an interrupt bus and each of the processor module contains an interrupt controller. The interrupt controller for performing an interrupt bus arbitration includes an interrupt bus arbiter. The interrupt bus arbiter has N number, e.g., 8 of arbitration cells, wherein each cell simultaneously receives a corresponding bit of the arbitration information, lower bits of the corresponding bit and corresponding lower bits of the wired-ORed interrupt bus data to generate an interrupt bus gain signal when the corresponding bits represent one logic state and the lower bits represent the other logic state; and a decision circuit connected to the arbitration cells for generating an interrupt bus gain decision signal when the interrupt bus gain signal is received.

5 Claims, 3 Drawing Sheets

MULTIPROCESSOR SYSTEM EMPLOYING AN IMPROVED SELF-CODED DISTRIBUTED INTERRUPT ARBITRATION TECHNIQUE

FIELD OF THE INVENTION

The present invention relates to a multiprocessor system; and, more particularly, to a multiprocessor system employing an improved self-coded distributed interrupt arbitration technique, which is capable of effectively reducing the time for the interrupt arbitration.

DESCRIPTION OF THE PRIOR ART

The proliferation of microprocessors has induced an economic incentive and a consequent trend to construct high performance systems employing multiprocessors instead of a single high performance processor. Such multiprocessor systems are facilitated by bus structure, otherwise referred to as a shared bus system, to which the microprocessors, system controllers and associated peripheral devices can be connected and through which they can communicate with each other. The devices connected to the shared bus structure can transfer data from one of the devices to another one or more of the devices in accordance with a predetermined protocol of communication.

The shared bus system generally includes an interrupt bus which shares global resources with multiple microprocessor devices and other devices on the shared bus and a failure of any device in the system will not stop other devices in the system from communicating with each other via the interrupt bus as long as the failure does not cause any illegal activity on the interrupt bus. Any device on the bus can, in principle, communicate directly with any other device on the interrupt bus.

There are, however, a number of problems that must be dealt with. Since the same interrupt bus is shared by a number of devices, a protocol for the interrupt bus arbitration must be established so that two or more processors do not accept a single interrupt concurrently. That is, if two or more devices simultaneously request an access to the interrupt bus, i.e., a contention occurs, one of them must be chosen in a reliable and a predictable manner.

To obtain a reliable interrupt bus arbitration, various interrupt bus arbitration schemes have been proposed in the art. One of the interrupt bus arbitration schemes for the multiprocessor system is disclosed in an article by Woo-Jong Hahn et al., "A mutiprocessor Server with a New Highly Pipelined Bus", *IEEE Proceedings of IPPS'96*, (April, 1996), wherein the multiprocessor system includes a highly pipelined bus employing a self-coded distributed interrupt arbitration scheme which is also disclosed in an article by D. Del Corso et al., "Microcomputer Buses and Links", *Academic press*, pp 143–154(1986). In the multiprocessor system, an interrupt bus arbiter contained in each device includes 8 arbitration cells, wherein the 8 arbitration cells compare the arbitration code contained in the interrupt bus arbiter with data code asserted by the interrupt bus in order to decide on which device will gain control of the interrupt bus without causing the above described contention problem.

However, since the arbitration cells cascaded sequentially compare the arbitration code with the bus data code in a bit-by-bit fashion, the conventional self-coded distributed interrupt arbitration scheme takes a substantial amount of time for carrying out the interrupt arbitration.

SUMMARY OF THE INVENTION

It is, therefore, primary object of the present invention to provide a multiprocessor system employing a self-coded distributed arbitration techniques, which is capable of effectively reducing the time for the interrupt arbitration.

In accordance with the present invention, there is provided a multiprocessor system having a shared bus and a plurality of processor modules, wherein the shared bus includes an interrupt bus and each of the processor module contains an interrupt controller, connected to the interrupt bus, for performing an interrupt bus arbitration, said interrupt controller comprising:

means for generating arbitration information represented by M-bit code one shot code, M being a positive integer greater than 1, wherein, when the arbitration information is fed to the interrupt bus, the interrupt bus asserts wired-ORed interrupt bus data represented by M-bit out; and interrupt bus arbitration means including:
M number of arbitration cells for, each receiving a corresponding bit of the arbitration information, lower bits of the corresponding bit and corresponding lower bits of the wired-ORed interrupt bus data to generate an interrupt bus gain signal when the corresponding bit represents one logic state and all of the lower bits represent the other logic state; and
decision means, connected to the arbitration cells, for generating a interrupt bus gain decision signal when the interrupt bus gain signal is received.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
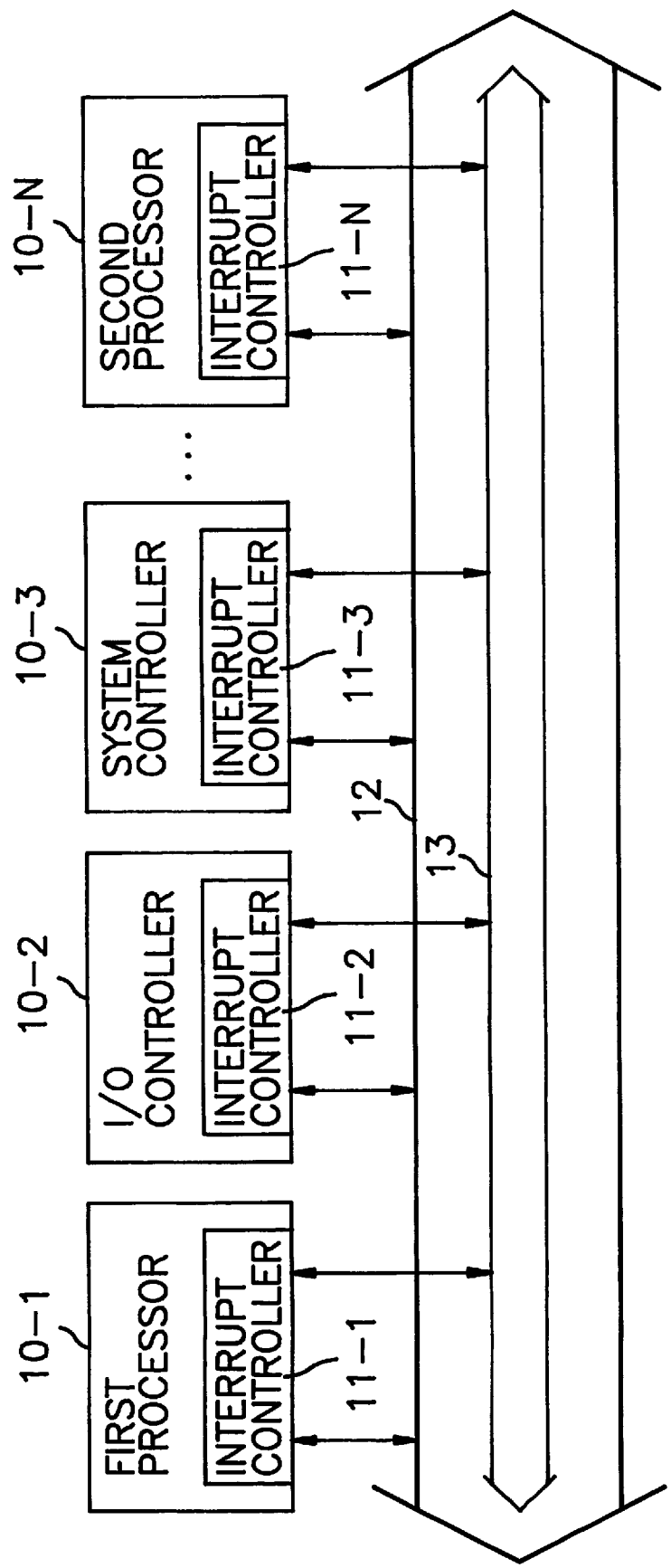
FIG. 1 provides a schematic diagram of a multiprocessor system having distributed interrupt controllers.

Referring to FIG. 1, there is shown a schematic diagram of a multiprocessor system employing the self-coded distributed interrupt arbitration technique. The multiprocessor system includes a first microprocessor module 10-1 and a second one 10-N, an input/output(I/O) controller module 10-2, and system controller module 10-3, N being a positive integer greater than 3. The multiprocessor system also can include any other associated peripheral modules (not shown).

The modules 10 (the suffix being omitted unless an indication of a particular module is needed) are commonly coupled to a bus 12 which includes a data bus, an address bus (not shown) and an interrupt bus 13, and is a shared bus referred as a "highly pipelined(HiPi)" bus in the present embodiment of the invention. Each of the modules on the HiPi bus is connected to the interrupt bus 13. By employing the HiPi bus 12 in the system, global resources can be shared among the multiple microprocessor modules and other modules connected thereto. In the HiPi bus, the interrupt bus controls the modules 10 on the HiPi bus and grants one of them an access to the interrupt bus 13 in accordance with a protocol, e.g., a known self-coded distributed interrupt arbitration scheme. Typically, the control of the interrupt bus 13 will be granted to any module which, e.g., 10-1, at the request of the interrupt bus 13 to establish a communication path between the module and another one, e.g., 10-3, connected to the interrupt bus 13. Any one of the modules, e.g., 10-1, can gain control of the interrupt bus 13, and the module gained such a control is called a master, while those modules 10 with which the bus master communicates are termed as slaves.

It may happen that two or more potential-master modules 10 attempt to gain control of the interrupt bus 13 at the same time, i.e., a contention occurs; therefore, there must be means for deciding on which module will be granted access to the interrupt bus. The process for making the decision is termed as an interrupt arbitration, and the process is performed by an interrupt bus arbitration unit, which is not centralized at a unit, but is distributed among the modules 10 connected to the interrupt bus 13. That is, the modules 10-1 to 10-N include, respectively, the interrupt controllers 11-1 to 11-N which collectively form the interrupt bus arbitration unit of the interrupt bus 13.

Each of the interrupt controllers 11 (suffix being omitted unless an indication of particular interrupt controller is needed) receives interrupt request signals from the associated modules 10, resolves the interrupt request contention and normally assigns the interrupt bus 13 to a specific module, e.g., 10-1, permitting that module 10-1 to become the interrupt master. Data exchange transactions are established between the interrupt master and a slave module in a step-by-step manner, utilizing an asynchronous, handshaking process.

Figure 2:
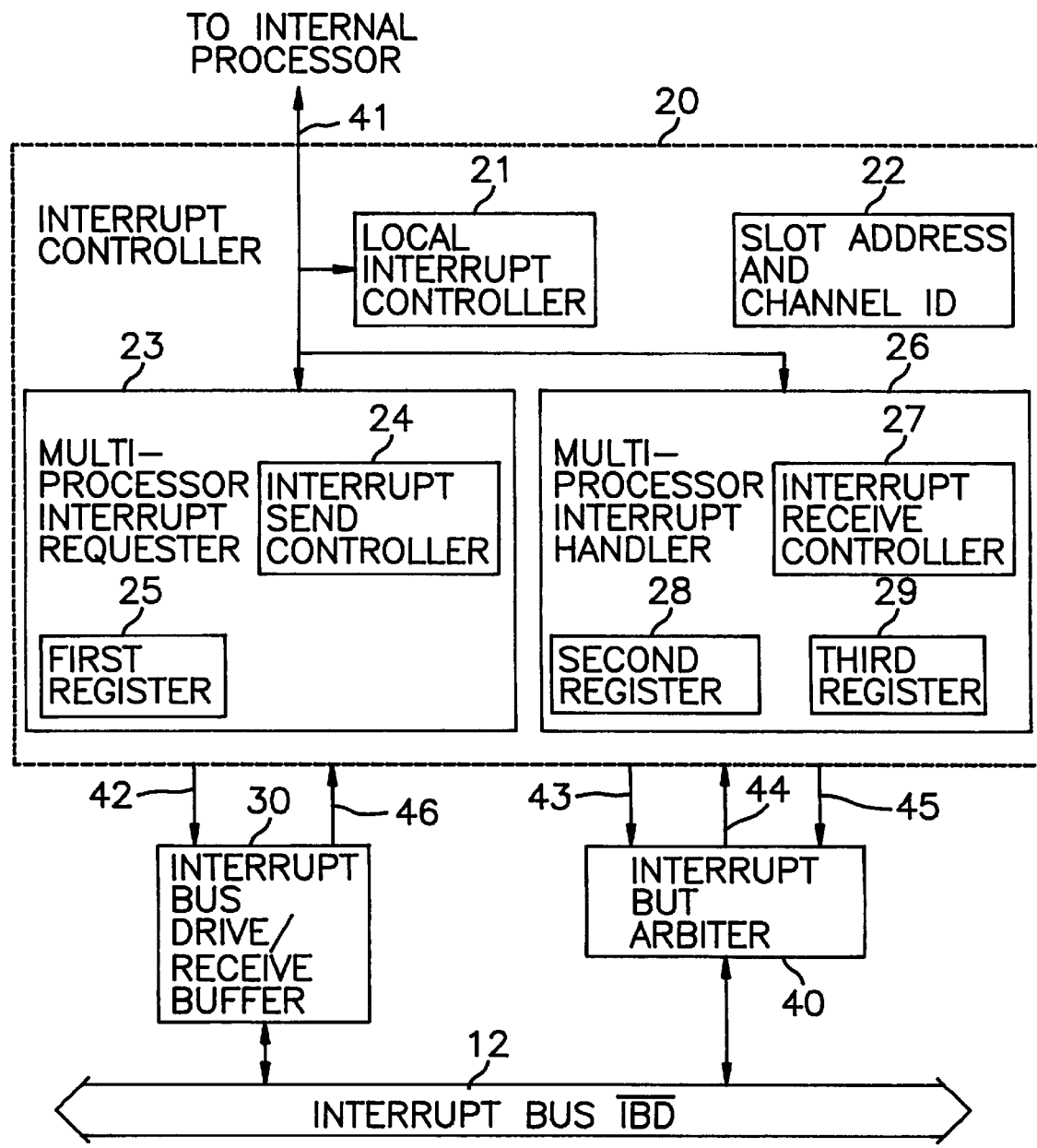
FIG. 2 represents a schematic block diagram of an interrupt controller employing an interrupt bus arbiter in accordance with the present invention.

Referring to FIG. 2, there is shown a block diagram of the interrupt controller shown in FIG. 1, wherein the interrupt controller 11 includes an interrupt control circuit 20, an interrupt bus drive/receive buffer 30 and an interrupt bus arbiter 40.

The interrupt control circuit 20 is connected via an internal bus 41 to an internal processor (not shown) of the module 10 shown in FIG. 1 to perform a known local interrupt control function for an internal interrupt bus by using a conventional local interrupt controller 21. The interrupt control circuit 20 is also coupled via the interrupt bus drive/receive buffer 30 and the interrupt bus arbiter 40 to the interrupt bus 13.

The interrupt control circuit 30 executes two interrupt arbitration modes: an interrupt transmission arbitration mode; and an interrupt reception arbitration mode. In the interrupt transmission arbitration mode, an interrupt request information is temporarily written by the processor via the internal bus 41 on a first register 25 of a multiprocessor interrupt requester 23, wherein the interrupt request information includes, e.g., a source address, a destination address, an interrupt vector and the like. And an arbitration enable signal OE generated by a multiprocessor interrupt requester 23 is then coupled via a line 45 to the interrupt bus arbiter 40. An arbitration information is fed via a line 43 to the interrupt arbiter 40n the feeding process being under the control of an interrupt send controller 24 of the multiprocessor interrupt requester 23 and is wired-ORed with interrupt bus data on the interrupt bus 13, wherein, in accordance with the present invention, the arbitration information is represented by M number of binary digit code encoded by a known one shot code, M being a positive integer greater than 1, e.g., 8.

The interrupt arbiter 40 simultaneously compares all bits of the interrupt arbitration information from the multiprocessor interrupt requester 23 with all bits of a wired-ORed interrupt bus data on the interrupt bus 13 to generate an interrupt bus gain decision signal representing the gain of the control of the interrupt bus 13. As described above, if two or more potential-master modules 10 shown in FIG. 1 simultaneously attempt to request an access to the interrupt bus 13, one of them is chosen by the distributed interrupt arbiters. That is, each interrupt arbiter compares its interrupt request information with the wired-ORed interrupt bus data and the one interrupt arbiter having its interrupt request information identical to the wired-ORed interrupt data gains control of the interrupt bus 13. When the interrupt arbiter 40 gains control of the interrupt bus 13 and the interrupt bus gain decision signal is coupled via a line 44 to the interrupt control circuit 20, the interrupt request information stored in the first register 25 is relayed via a line 42 and the interrupt bus drive/receive buffer 30 to the interrupt bus 13, the relaying process being controlled by the interrupt send controller 24.

On the other hand, in the interrupt reception arbitration mode, the arbitration enable signal OE-generated by a interrupt receive controller 27 of a multiprocessor interrupt handler is coupled via the line 45 to the interrupt arbiter 40. The arbitration information stored in a third register 29 is fed via a line 43 to the interrupt arbiter 40 under the control of an interrupt receive controller 27 of a multiprocessor interrupt handler 26 and is wired-ORed with interrupt bus data on the interrupt bus 13.

As described above, at the interrupt arbiter 40, the same comparison process described in the interrupt transmission arbitration mode is performed and the interrupt bus gain decision signal is generated when the interrupt arbiter 40 gains control of the interrupt bus 13. The interrupt bus gain decision signal is then coupled via line 44 to the interrupt controller 20, an interrupt vector contained in the interrupt bus data is temporarily stored in a second register 28 under the control of the interrupt receive controller 27. The stored interrupt vector is then relayed by the local interrupt process executed by the local interrupt controller 21 to the internal processor. On the other hand, a slot address and channel identification generator 22 generates a slot address and a channel identification code of the module 10, wherein the slot address and the channel identification code are determined by a physical position of the module 10 and coded by the internal processor in order to generate the arbitration information.

Figure 3:
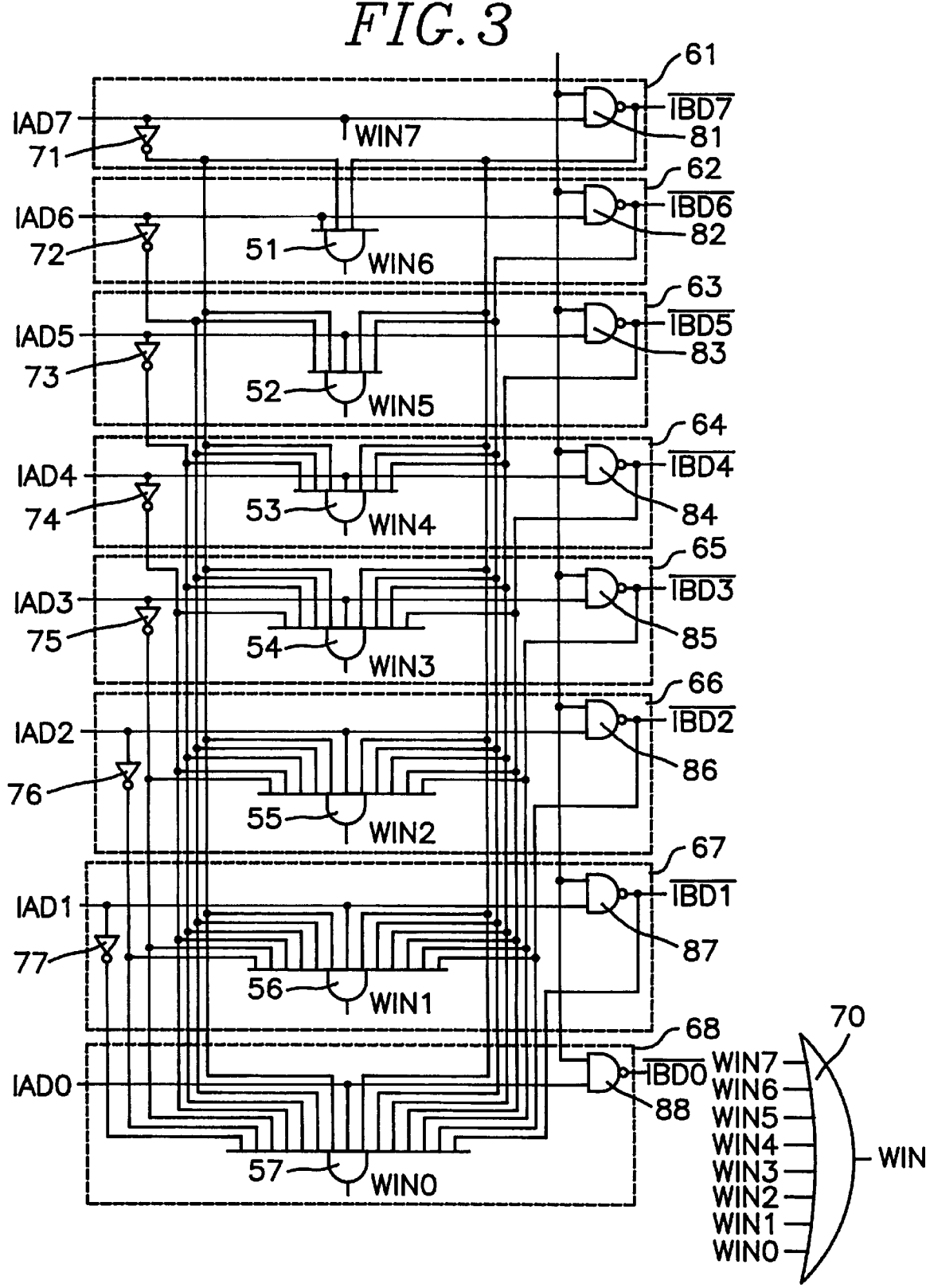
FIG. 3 describes an exemplary circuit diagram of the interrupt bus arbiter shown in FIG. 2.

Referring to FIG. 3, there is shown an exemplary circuit diagram of the interrupt bus arbiter in accordance with the present invention. Assuming that the number of the modules 10 is 8; and the interrupt bus 13 is formed of M-bit lines, e.g., 8-bit lines, the interrupt bus arbiter 40 includes M number, e.g., 8 arbitration cells 61 to 68 and a decision circuit 70. The arbitration cells 61 to 68 and the decision circuit 70 simultaneously compare all bits, e.g., 8 bits, of arbitration information IAD7 to IAD0 outputted from the interrupt control circuit 20 with all bits, e.g., 8 bits of the wired-ORed interrupt bus data asserted on the interrupt bus 13 in order to generate the interrupt bus gain decision signal.

Each of the arbitration cells, e.g., 62 serves to receive a corresponding bit from the arbitration information, its lower bits and corresponding bits from the wired-ORed interrupt bus data to generate an interrupt bus gain signal when the corresponding bit represents one logic state, e.g., "1" and all of the lower bits represent the other logic state, e.g., "0". The decision circuit 70 generates an interrupt bus gain decision signal when the interrupt bus gain signal is received.

As described above, when the number of the module 10 is 8, 8 one shot codes described in a table can be used as the arbitration information in the interrupt controllers.

TABLE

| No. | one shot code |
|-----|---------------|
| 1   | 0000 0001     |
| 2   | 0000 0010     |
| 3   | 0000 0100     |
| 4   | 0000 1000     |
| 8   | 1000 0000     |

When the number of the arbitration information is greater than 8, e.g. 16, 24 or more, a 16, 24 or more-bit one shot code can be used as the arbitration information. In this case, the interrupt bus has 8 bit width and the comparison process can be performed by using two, three or more arbitration cycles.

In the embodiment of the present invention shown in FIG. 3, the arbitration cells 62 to 68 include AND gates 51 to 57, each AND gate, e.g, 51, for Anding corresponding arbitration information bit, e.g, IAD6 and its logically inverted arbitration information lower bits, e.g., $\overline{IAD7}$ and logically inverted interrupt bus data corresponding lower bit, e.g., $\overline{IBD7}$. The arbitration cell 61 does not include the AND gate because the corresponding bit IAD7 is the least significant bit of the arbitration information IAD7 to IAD0.

The arbitration cells 62 to 68 also includes inverters 71 to 77 to generate logically inverted-arbitration information $\overline{IAD7}$ to $\overline{IAD1}$ and the arbitration cells 61 to 68 includes NAND gates 81 to 86 which generate logically inverted interrupt bus data $\overline{IBD7}$ to $\overline{IBD0}$. The NAND gates 81 to 88 are driven by the arbitration enable signal(OE) line 45.

When the modules 10-1 and 10-3 simultaneously attempt to gain control of an interrupt bus 13 and the modules 10-1 and 10-3 have "0000 0001" and "0000 0100" as arbitration information IAD0 to IAD7, respectively, the wired-ORed interrupt bus data IBD0 to IBD7 will be "0000 0101". In this case, at the interrupt bus arbiter of the interrupt controller 11-1, the output WIN7 from the arbitration cell 61 is "1", which is the interrupt bus gain signal. The output WIN6 from the arbitration cell 62 is "0" since, while the lower bits of the logically inverted arbitration information and interrupt bus data are "1" and "1", respectively, the input bit of the arbitration information is "0". The output WIN5 from the arbitration cell 62 is "0" since, while the lower bits of the logically inverted arbitration information and interrupt bus data are "1" and "1", the input bit of the arbitration information is "0". In a similar manner, the outputs WIN4 to WIN0 from the arbitration cells 65 to 69 become "0", "0", "0", "0" and "0", respectively. This comparison process is simultaneously performed.

The outputs WIN7 to WIN0 from the arbitration cells 61 to 68, i.e., "1000 0000" are fed to the OR gate 70 which generates the output signal WIN representing a logic "1" level as the interrupt bus gain decision signal. That is, the interrupt controller 11-1 gains control of the interrupt bus 13.

On the other hand, at the interrupt bus arbiter of the interrupt controller 11-3, the output WIN7 from the arbitration cell 61 is "0" since the least significant bit of the arbitration information is inputted to the arbitration cell 61. The output WIN6 from the arbitration cell 62 is "0" since, while the lower bits of the logically inverted arbitration information and interrupt bus data are "1" and "0", respectively, the input bit of the arbitration information is "0". The output WIN5 from the arbitration cell 62 is "0" since the lower bits of the logically inverted arbitration information and interrupt bus data are "1" and "0", respectively, and the input bit of the arbitration information is "1". In a similar manner, the outputs WIN4 to WIN0 from the arbitration cells 65 to 69 become "0", "0", "0" and "0", respectively. These comparison processes are performed simultaneously.

The outputs WIN7 to WIN0 from the arbitration cells 61 to 68, i.e., "0000 0000" are then simultaneously fed to the OR gate 70 which generates the output signal WIN representing a logic "0" level. That is, the interrupt controller 11-1 does not gain control of the interrupt bus 13 and waits for a next interrupt cycle.

As may be seen from the above, it can be readily appreciated that the multiprocessor employing the interrupt arbiter of the present invention is capable of achieving a substantial reduction in time for obtaining the reliable interrupt arbitration by simultaneously comparing all bits of the arbitration information with all bits of the interrupt bus data. Furthermore, the arbiter can be easily realized by using simple logic gates, e.g., AND gates and OR gates, and the arbitration information coded by the one shot code. In addition, since the control logic needs not be added to the I/O module, the system controller module and so on, existing I/O cards can be used with minor modification in the interrupt arbiter and arbitration information coding software means, e.g., read only memory data. Therefore, this embodiment is readily available to existing multiprocessor system by adding slightly modified hardwares and softwares.

While the present invention has been described with respect to the particular embodiments, it will be apparent to those skilled in the art that various changes and modifications may be made without departing from the spirit and scope of the invention as defined in the following claims.

What is claimed is:

1. A bus arbitration system having a shared bus and a plurality of processor modules, wherein the shared bus includes an interrupt bus and each of the processor modules contains an interrupt controller connected to the interrupt bus, said interrupt controller comprising:

means for generating arbitration information represented by M-bit code, M being a positive integer greater than 1, wherein, when the arbitration information is fed to the interrupt bus, the interrupt bus asserts wired-ORed interrupt bus data represented by M-bit code; and interrupt bus arbitration means including:

M number of arbitration cells for, each receiving one corresponding bit out of the arbitration information, a digit of each corresponding bit corresponding to an order of the arbitration cells, lower bits of the corresponding bit and lower bits of the corresponding bit in the wired-ORed interrupt bus data to generate an interrupt bus gain signal when the corresponding bit represents one logic state and all of the lower bits represent the other logic state; and decision means connected to the arbitration cells, for generating an interrupt bus gain decision signal when the interrupt bus gain signal is received, wherein each of the arbitration cells includes a first inverter means for generating a logically inverted bit from the arbitration information, a second inverter means for generating a logically inverted bit of the wired-ORed interrupt bus data, and an AND logic means for receiving and ANDing the corresponding bit of the arbitration information and logically inverted lower bit of the corresponding bit and corresponding logically inverted lower bit of the wired-ORed interrupt bus data to generate an AND logic output signal; and the decision means includes an OR logic means for receiving and ORing logic output signals from each of the arbitration cells to generate an OR logic output signal.

2. The bus arbitration system as recited in claim 1, wherein the second inverter means is activated by receiving an arbitration enable signal generated from the interrupt controller.

3. A bus arbitration system for a computer system having a plurality of processors and a plurality of peripheral devices contending for a shared bus comprising:

an interrupt bus; and a plurality of interrupt controllers connected to said interrupt bus, each of said interrupt controllers managing access to the shared bus for a corresponding one of said processors or said peripheral devices, each of said interrupt controllers comprising:

means for generating an arbitration data code having at least one bit, said interrupt bus inputing said arbitration data code from each of said interrupt controllers, performing a wired-OR operation on said arbitration data code and outputing a resulting interrupt bus data code having at least one bit;

at least one arbitration cell, each of said arbitration cells inputing a corresponding bit of said arbitration data code, inputing lower bits of said arbitration data code, inputing a corresponding bit of said interrupt bus data code, inputing lower bits of said interrupt bus data code and outputing an interrupt bus gain signal when said corresponding bit of said arbitration data code has a predetermined logic value and each of the lower bits of said interrupt bus data code do not have the predetermined logic value; and decision means connected to said at least one arbitration cell and generating an interrupt bus gain decision signal upon receiving said interrupt bus gain signal.

4. The bus arbitration system as in claim 3 wherein each of said at least one arbitration cell comprises a first inverter means inputing said corresponding bit of said arbitration data code and outputing an inverted logic value of said corresponding bit of said arbitration data code, a second inverter means inputing said corresponding bit of said interrupt bus data code and outputing an inverted logic value of said corresponding bit of said interrupt bus data code, and an AND logic means inputing said corresponding bit of said arbitration data code, inputing the inverted logic value of each of the lower bits of said arbitration data code, inputing the inverted logic value of each of the lower bits of said interrupt bus data code, performing an AND operation and outputing said interrupt bus gain signal, wherein said decision means comprises an OR logic means inputing the output of said AND logic means of each of said at least one arbitration cell, performing an OR operation, and outputing the interrupt bus gain decision signal.

5. The bus arbitration system as in claim 4 wherein said at least one interrupt controller generates an arbitration enable signal and activates said second inverter of each of said at least one activation cell.

* * * * *